US009714834B2

(12) United States Patent
Yahata (10) Patent No.: US 9,714,834 B2
(45) Date of Patent: Jul. 25, 2017

(54) ELECTRONIC DEVICE, ARRIVAL DETERMINATION METHOD, AND RECORDING MEDIUM

(71) Applicant: CASIO COMPUTER CO., LTD., Shibuya-ku, Tokyo (JP)

(72) Inventor: Takashi Yahata, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 25 days.

(21) Appl. No.: 14/666,271

(22) Filed: Mar. 23, 2015

(65) Prior Publication Data

US 2015/0377633 A1 Dec. 31, 2015

(30) Foreign Application Priority Data

Jun. 30, 2014 (JP) .................. 2014-135142

(51) Int. Cl.
*G01C 21/30* (2006.01)
*G01C 21/32* (2006.01)
*G09B 29/10* (2006.01)
*G09B 29/00* (2006.01)

(52) U.S. Cl.
CPC .......... *G01C 21/30* (2013.01); *G09B 29/007* (2013.01); *G09B 29/102* (2013.01)

(58) Field of Classification Search
CPC .... G01C 21/30; G01C 21/36; G01C 21/3629; G01C 21/367; G01C 21/3632; G09B 29/007; G09B 29/102; G08G 1/0969
USPC .... 701/1, 400, 408, 409, 410, 412, 428, 431
See application file for complete search history.

(56) References Cited

U.S. PATENT DOCUMENTS

| 7,603,231 B2* | 10/2009 | Ogawa ............... G01C 21/3605 701/438 |
| 7,962,280 B2* | 6/2011 | Kindo ................ G01C 21/3407 340/995.15 |
| 9,200,916 B2* | 12/2015 | Yoshida ............... G01C 21/343 |
| 2005/0187707 A1* | 8/2005 | Yokota ............... G01C 21/3476 701/410 |
| 2006/0129315 A1* | 6/2006 | Kanematsu ........ G01C 21/3461 340/995.1 |
| 2007/0112510 A1* | 5/2007 | Ogawa ............... G01C 21/3605 701/438 |
| 2008/0120021 A1* | 5/2008 | Kaneda ................ G01C 21/343 701/533 |
| 2009/0271105 A1* | 10/2009 | Kindo ................ G01C 21/3407 701/439 |
| 2011/0010085 A1* | 1/2011 | Tanaka ............... G01C 21/3461 701/533 |

(Continued)

FOREIGN PATENT DOCUMENTS

JP 2001147129 A * 5/2001
JP 2012098030 A 5/2012

*Primary Examiner* — Jaime Figueroa
(74) *Attorney, Agent, or Firm* — Holtz, Holtz & Volek PC (57) ABSTRACT

An electronic device configured to detect arrival at a specified location, includes: a location information acquisition unit configured to acquire current location of the electronic device; a detection range setting unit configured to set detection ranges for detecting arrival of the electronic device at specified locations given the order; and a detection range control unit configured to change the detection ranges according to location status of the electronic device based on relationship between the current location and the specified locations.

10 Claims, 9 Drawing Sheets

(56) References Cited

U.S. PATENT DOCUMENTS

| | | | | |
|---|---|---|---|---|
| 2012/0290199 A1* | 11/2012 | Nadam | ................ | G01C 21/005 701/409 |
| 2013/0215009 A1* | 8/2013 | Fukumoto | ................ | G09G 5/37 345/156 |
| 2014/0372025 A1* | 12/2014 | Yoshida | ................ | G01C 21/343 701/467 |
| 2015/0350833 A1* | 12/2015 | Kazemi | ................ | H04W 4/028 455/456.6 |

* cited by examiner

ELECTRONIC DEVICE, ARRIVAL DETERMINATION METHOD, AND RECORDING MEDIUM

BACKGROUND OF THE INVENTION

The present invention relates to an electronic device, an arrival determination method, and a recording medium.

DESCRIPTION OF THE RELATED ART

There is generally known a technique related to map matching by which location measurement is performed by a Global Positioning System (GPS), acceleration sensor, geomagnetic sensor, or gyro sensor, and the current location is displayed on a map.

The use of map matching makes it possible to determine whether an object has arrived at points on a route such as a start point, midway point, and goal point set on the map.

For example, JP 2012-098030 A discloses such a technique for determining arrival at points on a route set on a map with the use of map matching.

However, according to various location measurement techniques for use in measurement of the current location, the results of location measurement generally include errors. Thus, even if an object moves in a straight line, the results of location measurement of the object may have fluctuations from front to back and from side to side. The arrival of the object at a point set on the map is determined depending on whether the result of location measurement falls within a predetermined range from the point set on the map. Therefore, if fluctuations occur in the result of location measurement, the arrival of the object at the point set on the map may be wrongly determined. This makes it difficult to properly determine the arrivals of the object at the points on the route set on the map.

BRIEF SUMMARY OF THE INVENTION

The present invention is devised in light of such circumstances. An object of the present invention is to provide an electronic device, arrival determination method, and recording medium that allow appropriate determination on arrival of an object at points on a route set on a map.

According to an embodiment of the present invention, an electronic device configured to detect arrival at a specified location, includes: a location information acquisition unit configured to acquire current location of the electronic device; a detection range setting unit configured to set detection ranges for detecting arrival of the electronic device at specified locations given the order; and a detection range control unit configured to change the detection ranges according to location status of the electronic device based on relationship between the current location and the specified locations.

According to an embodiment of the present invention, the detection range control unit changes sizes of the detection ranges.

According to an embodiment of the present invention, the detection range setting unit reduces the detection ranges when the current location has departed from the detection ranges.

BRIEF DESCRIPTION OF THE SEVERAL VIEWS OF THE DRAWING

FIGS. 1A and 1B are diagrams illustrating configurations of a wrist terminal as an embodiment of an electronic device in the present invention.

FIGS. 5A and 5B are diagrams illustrating states where a detection range is reduced after arrival of the wrist terminal.

FIGS. 11A and 11B are schematic diagrams illustrating states where a detection range is enlarged at entry of the wrist terminal into the detection range: FIGS. 12A and 12B are diagrams illustrating examples of changing the shape of the detection range for a specified point according to the progress status.

DETAILED DESCRIPTION OF THE INVENTION

Embodiments of the present invention will be described below with reference to the accompanying drawings.

[Hardware Configuration]

Figure 1A:
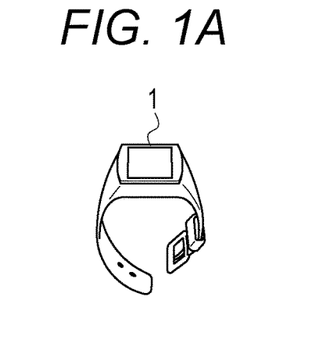
FIG. 1A is a diagram illustrating an outer configuration of the wrist terminal.
Figure 1B:
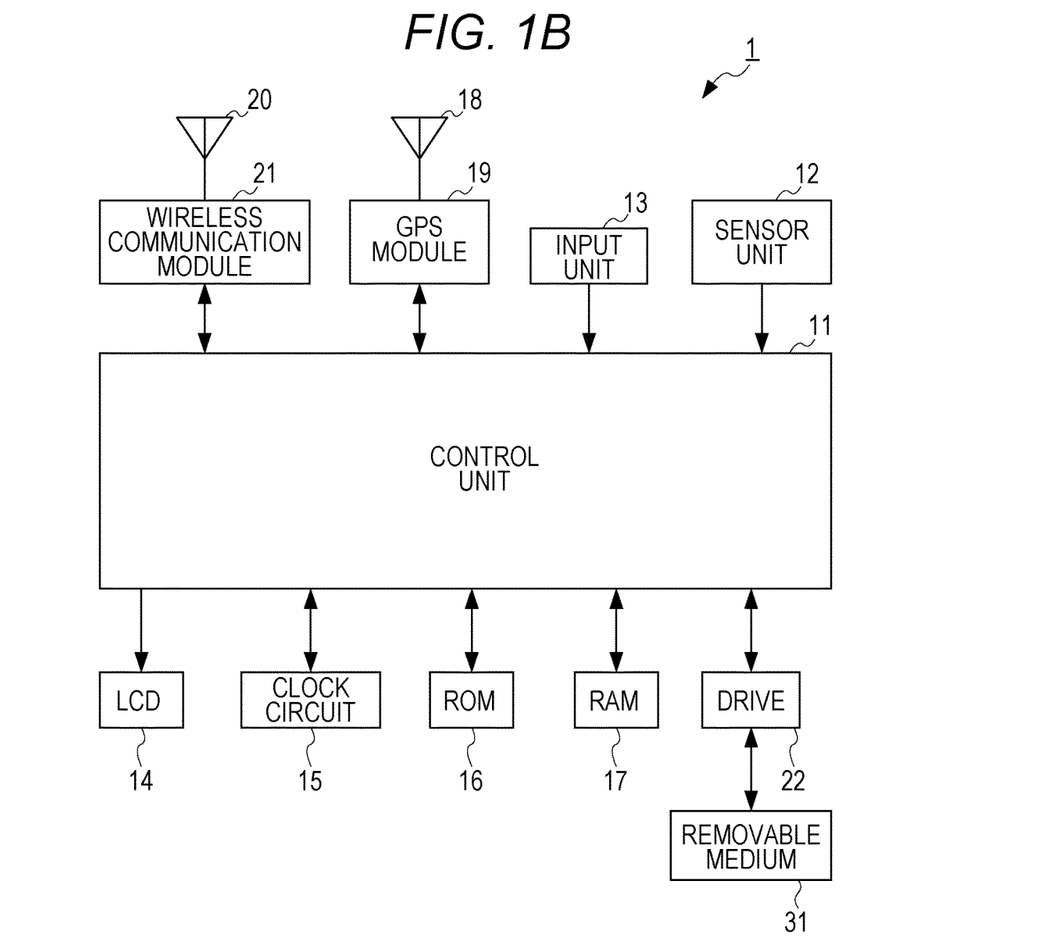
FIG. 1B is a block diagram illustrating a hardware configuration of the same.

FIGS. 1A and 1B are diagrams illustrating configurations of a wrist terminal 1 as an embodiment of an electronic device in the present invention: FIG. 1A is a diagram illustrating an outer configuration of the wrist terminal; and FIG. 1B is a block diagram illustrating a hardware configuration of the same.

The wrist terminal 1 is an electronic device that is formed in the shape of a wrist watch and is provided with smartphone-like functions.

As illustrated in FIG. 1, the wrist terminal 1 includes a control unit 11, a sensor unit 12, an input unit 13, a Liquid Crystal Display (LCD) 14, a clock circuit 15, a Read Only Memory (ROM) 16, a Read Access Memory (RAM) 17, a Global Positioning System (GPS) antenna 18, a GPS module 19, a wireless communication antenna 20, a wireless communication module 21, and a drive 22.

The control unit 11 is composed of an arithmetic processing unit such as a Central Processing Unit (CPU) to control entire operations of the wrist terminal 1. For example, the control unit 11 executes various processes according to programs recorded in the ROM 16 such as a program for a route display control process (described later).

The sensor unit 12 includes various sensors such as a triaxial acceleration sensor, magnetic sensor, air-pressure sensor, or temperature sensor.

The input unit 13 is composed of various buttons and a capacitance or resistive location input sensor stacked in a display area of the LCD 14, and is configured to input various kinds of information according to user's instructive operations.

The LCD 14 outputs images according to instructions from the control unit 11. For example, the LCD 14 displays various images and user interface screens. In the embodiment, the location input sensor of the input unit 13 is superimposed on the LCD 14 to constitute a touch panel.

The clock circuit 15 generates a time signal from a signal generated by a system clock or an oscillator, and outputs the current time.

The ROM 16 is composed of a flash ROM and the like and is configured to store information for control programs and others executed by the control unit 11.

The RAM 17 provides a work area for the control unit 11 to execute various processes.

The GPS antenna 18 receives a radio wave transmitted from a satellite in the GPS and converts the same into an electric signal, and outputs the converted electric signal (hereinafter, referred to as "GPS signal") to the GPS module 19.

The GPS module 19 detects the location of the wrist terminal 1 (latitude, longitude, and height) and the current time indicated by the GPS, according to the GPS signal input from the GPS antenna 18. The GPS module 19 also outputs the information about the detected location and current time to the control unit 11.

The wireless communication antenna 20 is capable of receiving a radio wave at a frequency corresponding to wireless communication used by the wireless communication module 21, and is composed of a loop antenna or a rod antenna, for example. The wireless communication antenna 20 transmits an electric signal of wireless communication input from the wireless communication module 21 as an electromagnetic wave, or converts the received electromagnetic wave into an electric signal and outputs the same to the wireless communication module 21.

The wireless communication module 21 transmits signals to other devices via the wireless communication antenna 20 according to instructions from the control unit 11. The wireless communication module 21 also receives signals transmitted from other devices and outputs the information indicated by the received signals to the control unit 11.

A removable medium 31 composed of a magnetic disk, optical disk, magneto-optical disk, or semiconductor memory, is attached to the drive 22 as appropriate. The removable medium 31 can store various data such as image data.

[Functional Configuration]

Next, a functional configuration of the wrist terminal 1 will be described.

Figure 2:
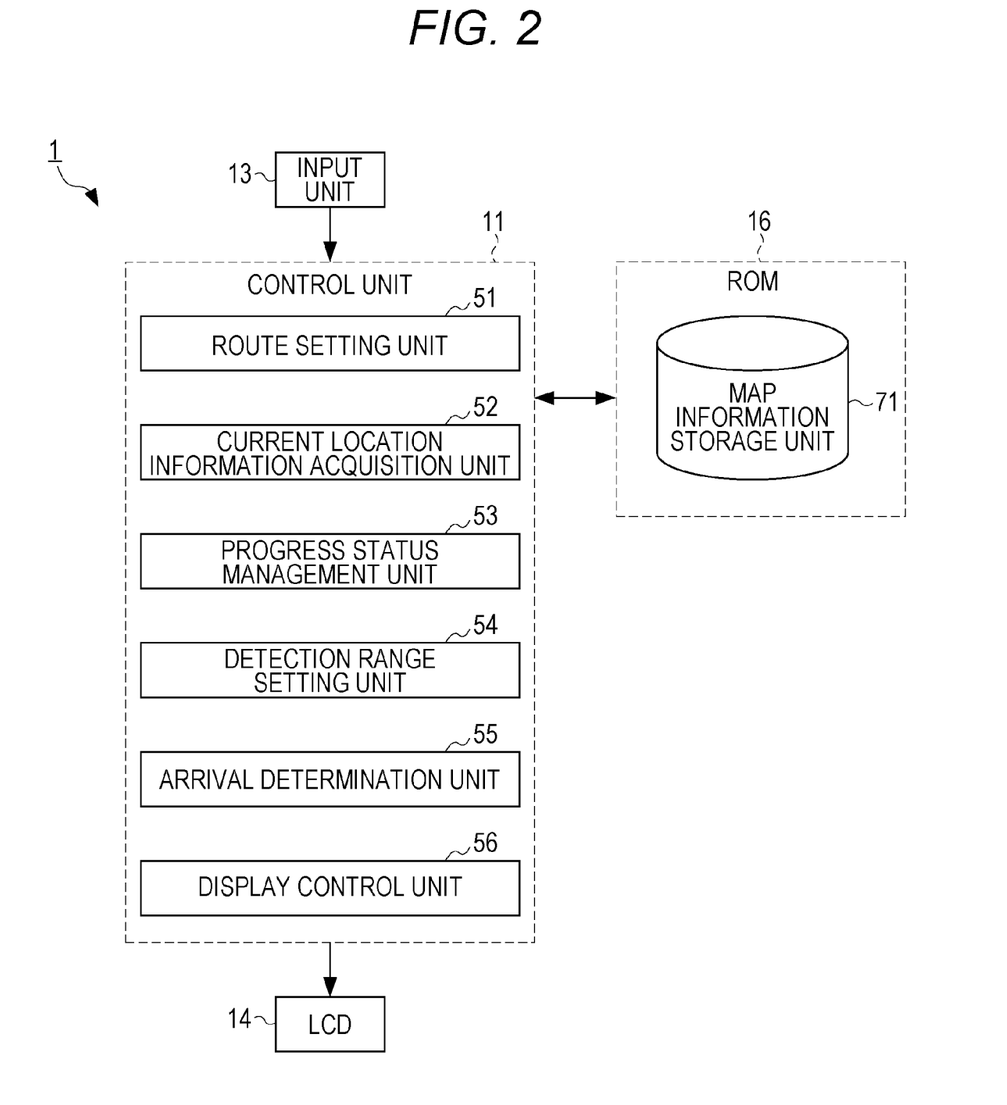
FIG. 2 is a functional block diagram illustrating a functional configuration for execution of a route display control process in the functional configuration of the wrist terminal.

FIG. 2 is a functional block diagram illustrating a functional configuration for execution of the route display control process in the functional configuration of the wrist terminal 1.

The route display control process includes a series of steps at which to set a route including a start point, midway point, and goal point on a map, acquire the current location of the wrist terminal 1, and displaying the location of the wrist terminal 1 on the route while determining whether the wrist terminal 1 has arrived at each of the points on the route.

At execution of the route display control process, as illustrated in FIG. 2, the control unit 11 operates a route setting unit 51, a current location information acquisition unit 52, a progress status management unit 53, a detection range setting unit 54, an arrival determination unit 55, and a display control unit 56.

There are formed in a portion of the ROM 16, a map information storage unit 71, a set route storage unit 72, and a movement history storage unit 73.

The map information storage unit 71 stores map data to be displayed in the route display control process.

The set route storage unit 72 stores information indicative of a route including a start point, midway point, and goal point set by a user.

The movement history storage unit 73 stores a movement history of the wrist terminal 1 (previous location measurement results, estimated times of arrival at midway points, and others).

The route setting unit 51 sets a start point and a goal point input by the user via the input unit 13 or the like. When any midway point between the start point and the goal point is input by the user, the route setting unit 51 sets the midway point as well. One or more midway points may be set. When a plurality of midway points is set, an estimated arrival order is set as well. In the embodiment, the start point, midway point(s), and goal point will be referred to collectively as "specified points." Of the specified points, the start point comes first in the estimated arrival order and the goal point comes last in the estimated arrival order. In the embodiment, estimated times of arrival at the start point, midway point(s), and goal point are set.

The route setting unit 51 stores in the set route storage unit 72 information indicative of a route from the set start point to goal point (the locations of the specified points, estimated arrival order, estimated times of arrival, and others).

The current location information acquisition unit 52 acquires the location of the wrist terminal 1 and the current time detected by the GPS module. The current location information acquisition unit 52 also stores in the movement history storage unit 73 the acquired location of the wrist terminal 1 and current time in association with each other.

The progress status management unit 53 manages the current progress status on the entire route, according to the map data stored in the map information storage unit 71, the information indicative of the route stored in the set route storage unit 72, the movement history of the wrist terminal 1 stored in the movement history storage unit 73, the location of the wrist terminal 1 and the current time acquired by the current location information acquisition unit 52. For example, the progress status management unit 53 determines at which of the specified points on the route the wrist terminal 1 have already arrived. The progress status management unit 53 also calculates the difference between the estimated time of arrival at each of the specified points and the current time or calculates the distance to each of the specified points.

The detection range setting unit 54 sets the detection range for each of the specified points. The detection range setting unit 54 also changes the mode (size in this example) of the detection range for each of the specified points, according to the progress status managed by the progress status management unit 53. The detection range refers to an area around the specified point, and when the current location of the wrist terminal 1 falls within the area, it is determined that the wrist terminal 1 has arrived at the specified point. In the embodiment, the detection range is set as a circular area.

Specifically, as for the specified points at which the wrist terminal 1 has not yet arrived, the detection range setting unit 54 sets smaller detection ranges with larger differences between the current time and the estimated times of arrival at the specified points (that is, setting smaller-radius areas). Therefore, the detection ranges are larger for specified points with smaller differences between the current time and the estimated arrival times (that is, setting larger-radius areas). The detection range setting unit 54 also reduces the detection ranges for specified points at which the wrist terminal 1 has already arrived.

When a detection range is reduced for a specified point at which the wrist terminal 1 has already arrived, the radius of the detection range may be set to the smallest prescribed value.

The arrival determination unit 55 determines whether the location of the wrist terminal 1 acquired by the current location information acquisition unit 52 falls within the detection range for each of the specified points set by the detection range setting unit 54. When determining that the location of the wrist terminal 1 falls within the detection range, the arrival determination unit 55 determines that the wrist terminal 1 has arrived at the specified point. When determining that the wrist terminal 1 has arrived at the specified point, the arrival determination unit 55 associates the current time with the specified point and stores the information indicating the arrival at the specified point in the movement history storage unit 73.

The display control unit 56 displays on the map the route including the start point, midway point(s), and goal point, based on the map data stored in the map information storage unit 71 and the information indicative of the route stored in the set route storage unit 72. The display control unit 56 also displays on the map the detection ranges for the specified points set by the detection range setting unit 54. The display control unit 56 further displays on the map the status of movement of the wrist terminal 1 to the present, based on the progress status determined by the progress status management unit 53.

[Operations]

Next, operations will be described.

Figure 3:
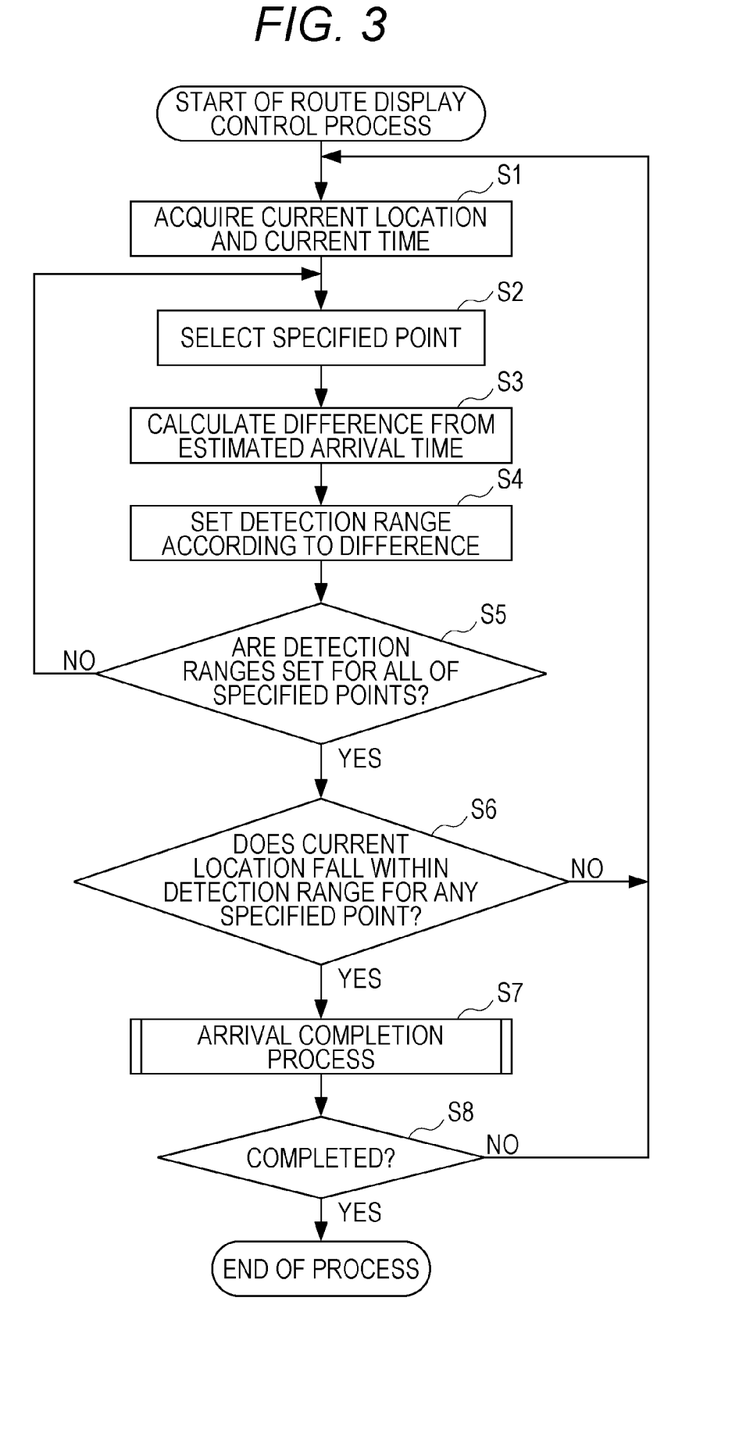
FIG. 3 is a flowchart of a route display control process executed by the wrist terminal illustrated in FIG. 1 with the functional configuration illustrated in FIG. 2.

FIG. 3 is a flowchart of the route display control process executed by the wrist terminal 1.

The route display control process is started by inputting via the input unit 13 an instruction for activation of the route display control process.

When the route display control process is started, the current location information acquisition unit 52 acquires at step S1 the location of the wrist terminal 1 and the current time detected by the GPS module.

At step S2, the progress status management unit 53 selects one of the specified points on the route. For example, each time step S2 is repeated, the progress status management unit 53 specifies one of the specified points given the order on the route from the start point.

At step S3, the progress status management unit 53 calculates the difference between the estimated time of arrival at the specified point and the current time.

At step S4, the detection range setting unit 54 sets the detection range for each of the specified points, according to the difference between the estimated time of arrival at the specified point and the current time calculated by the progress status management unit 53.

At step S5, the progress status management unit 53 determines whether detection ranges have been set for all of the specified points by the detection range setting unit 54.

When detection ranges have been set for all of the specified points by the detection range setting unit 54, the determination result is YES at step S5 and the process is moved to step S6.

Meanwhile, when no detection ranges have been set for all of the specified points by the detection range setting unit 54, the determination result is NO at step S5 and the process is moved to step S2.

At step S6, the arrival determination unit 55 determines whether the location of the wrist terminal 1 acquired by the current location information acquisition unit 52 falls within the detection range for any of the specified points set by the detection range setting unit 54.

When the location of the wrist terminal 1 acquired by the current location information acquisition unit 52 falls within the detection range for any of the specified points set by the detection range setting unit 54, the determination result is YES at step S6 and the process is moved to step S7.

Meanwhile, when the location of the wrist terminal 1 acquired by the current location information acquisition unit 52 does not fall within the detection range for any of the specified points set by the detection range setting unit 54, the determination result is NO at step S6 and the process is moved to step S1.

At step S7, an arrival completion process described later is executed.

At step S8, the progress status management unit 53 determines whether an instruction for termination of the route display control process has been input.

When no instruction for termination of the route display control process has been input, the process is moved to step S1.

Meanwhile, when an instruction for termination of the route display control process has been input, the route display control process is terminated.

Next, the arrival completion process executed as a sub flow at step S7 of the route display control process will be described.

Figure 4:
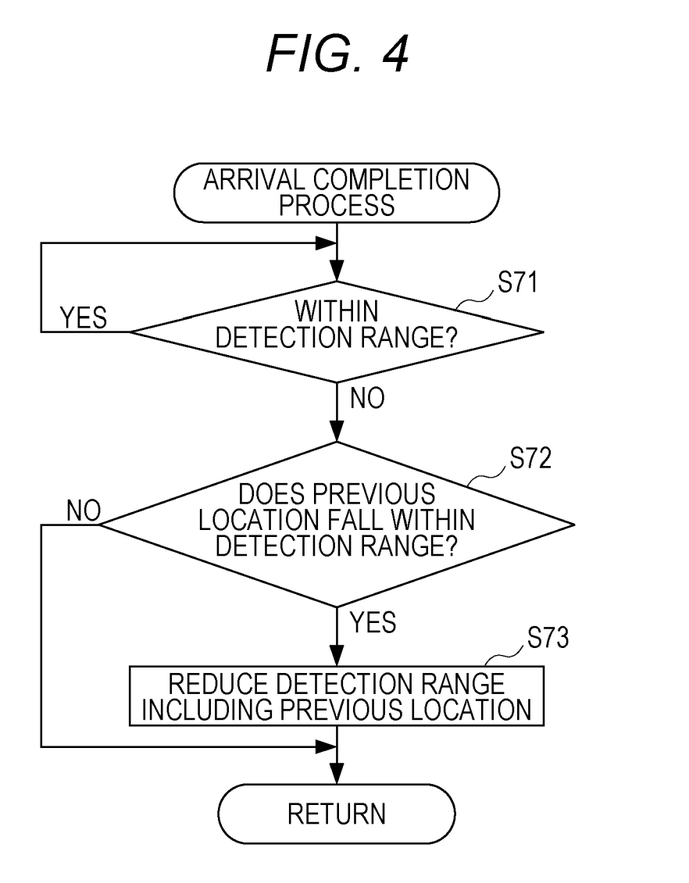
FIG. 4 is a flowchart of an arrival completion process.

FIG. 4 is a flowchart of the arrival completion process.

When the arrival completion process is started, the arrival determination unit 55 determines at step S71 whether the location of the wrist terminal 1 acquired by the current location information acquisition unit 52 continues to fall within the detection range for the specified point set by the detection range setting unit 54.

When the location of the wrist terminal 1 acquired by the current location information acquisition unit 52 does not fall within the detection range for the specified point set by the detection range setting unit 54, the determination result is NO at step S71 and the process is moved to step S72.

Meanwhile, when the location of the wrist terminal 1 acquired by the current location information acquisition unit 52 continues to fall within the detection range for the specified point set by the detection range setting unit 54, the determination result is YES at step S71, and step S71 is repeated.

At step S72, the progress status management unit 53 determines whether the previous location of the wrist terminal 1 has fallen within the detection range for the specified point.

When the previous location of the wrist terminal 1 has fallen within the detection range for the specified point, the determination result is YES at step S72 and the process is moved to step S73.

Meanwhile, when the previous location of the wrist terminal 1 has not fallen within the detection range for the specified point, the determination result is NO at step S72 and the process is returned to the route display control process.

At step S73, the detection range setting unit 54 reduces the detection range including the previous location of the wrist terminal 1.

After step S73, the process is returned to the route display control process.

Figure 5A:
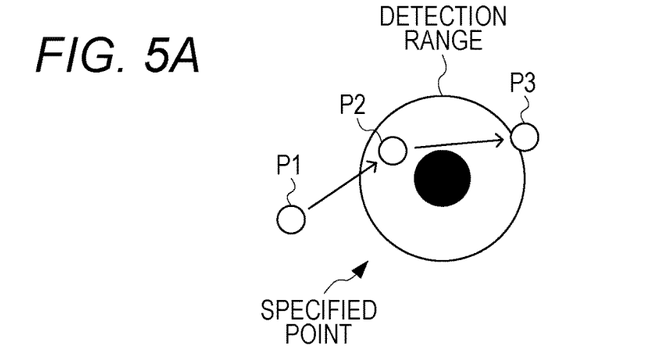
FIG. 5A illustrates the state immediately after departure of the wrist terminal from the detection range.
Figure 5B:
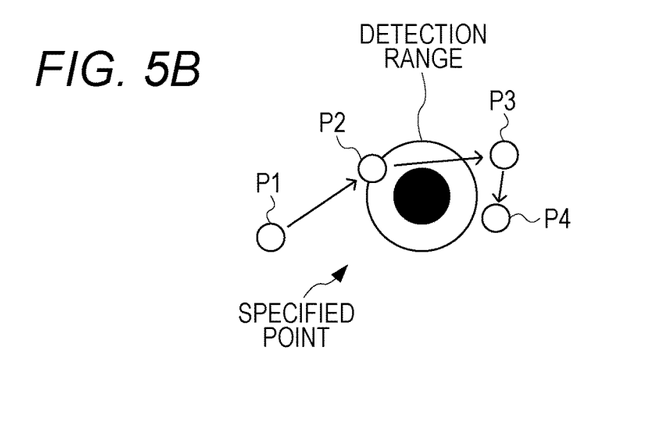
FIG. 5B illustrates the state where the detection range is reduced after departure of the wrist terminal from the detection range.

FIGS. 5A and 5B are diagrams illustrating states where a detection range is reduced after arrival of the wrist terminal 1: FIG. 5A illustrates the state immediately after departure of the wrist terminal 1 from the detection range; and FIG. 5B illustrates the state where the detection range is reduced after departure of the wrist terminal 1 from the detection range.

As illustrated in FIG. 5B, by reducing the detection range after departure of the wrist terminal 1 from the detection range, it is possible to suppress the event that, when the wrist terminal 1 moves around the outer edge of the detection range, it is wrongly determined that the wrist terminal 1 has arrived again at the specified point, as compared to the case where the detection range is not changed in size. In the example of FIG. 5B, it is possible to suppress the event that, when the wrist terminal 1 moves to locations P1 to P4 in order, it is wrongly determined that the wrist terminal 1 has entered again the detection range, and has arrived again at the specified point at the time of movement from the location P3 to the location P4.

[Specific Examples of Operations]

Figure 6:
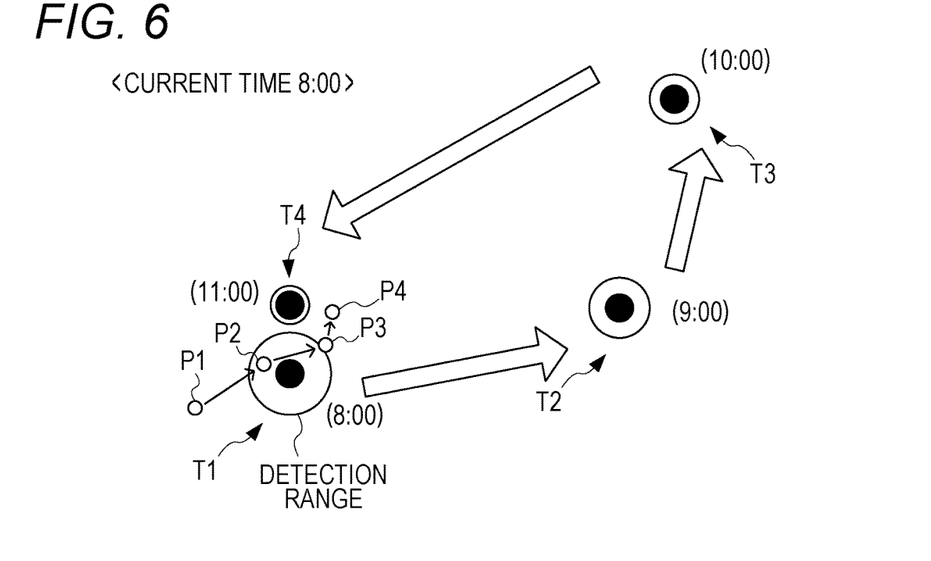
FIG. 6 is a diagram illustrating a specific example of determination on arrival at specified points on a route.
Figure 7:
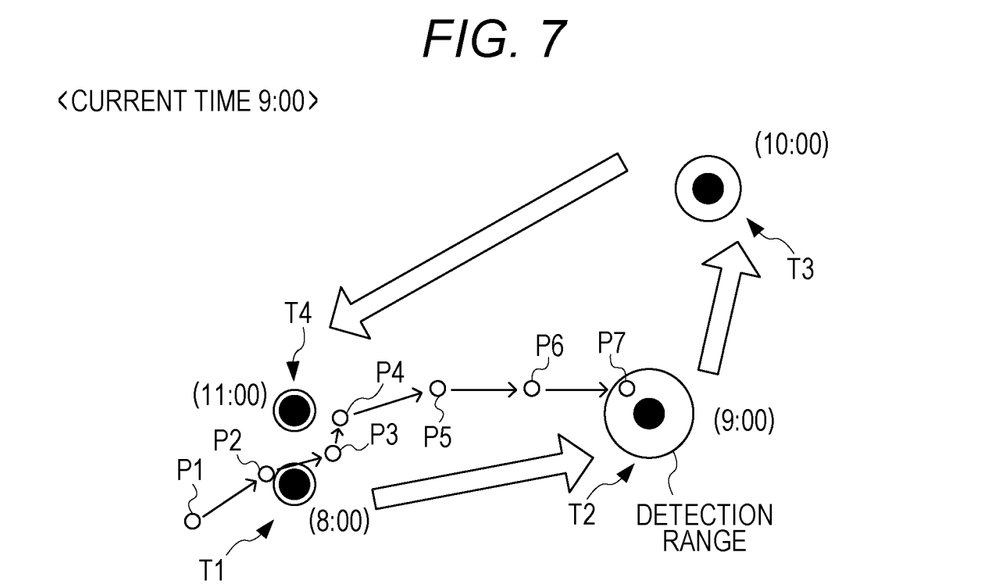
FIG. 7 is a diagram illustrating a specific example of determination on arrival at specified points on a route.
Figure 8:
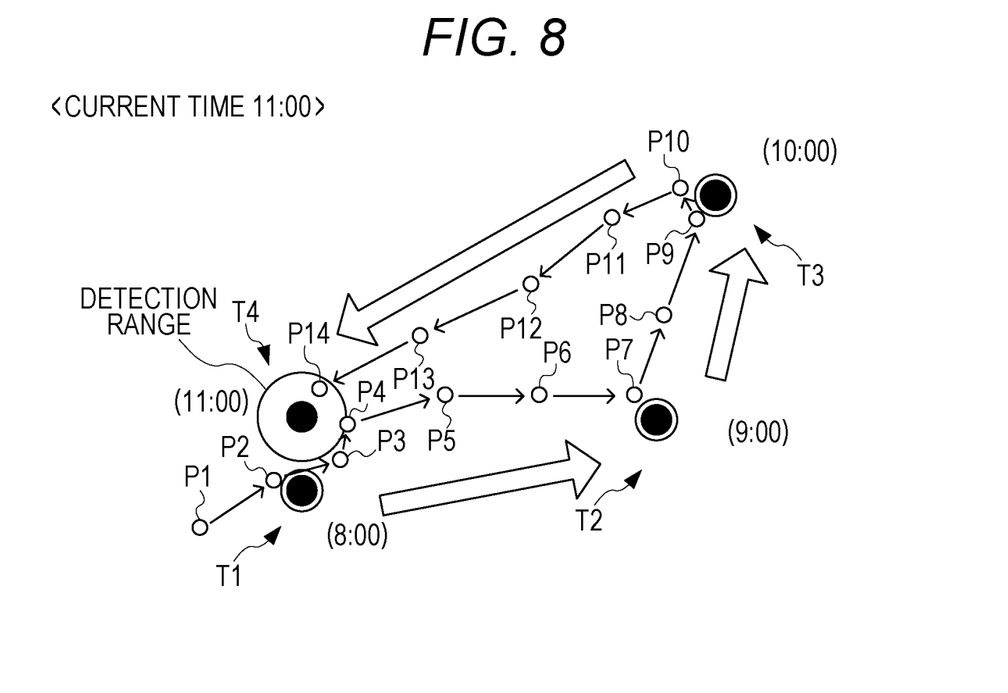
FIG. 8 is a diagram illustrating a specific example of determination on arrival at specified points on a route.

FIGS. 6 to 8 are diagrams illustrating specific examples of determination on arrival at specified points on a route: FIG. 6 illustrates the state at the current time of 8:00; FIG. 7 illustrates the state at the current time of 9:00; and FIG. 8 illustrates the state at the current time of 11:00. Each of FIGS. 6 to 8 illustrates partial areas around midway points T1 to T4 on the set route.

As illustrated in FIGS. 6 to 8, the estimated times of arrival at the midway points T1 to T4 are 8:00 at the midway point T1, 9:00 at the midway point T2, 10:00 at the midway point T3, and 11:00 at the midway point T4.

As illustrated in FIG. 6, when the current time is 8:00, the estimated time of arrival at the midway point T1 is 8:00. The detection range setting unit 54 thus sets the detection range for the midway point T1 as a larger-radius circle. Meanwhile, the detection range setting unit 54 sets smaller detection ranges for the midway points T2 to T4 in this order as smaller-radius circles with increasing differences between the current time and the estimated times of arrival.

In the state of FIG. 6, when the wrist terminal 1 moves near the midway point T1, the locations of the wrist terminal 1 are acquired in order as locations P1 to P4. When the wrist terminal 1 has arrived at the location P2 in the detection range, the arrival determination unit 55 determines that the wrist terminal 1 has arrived at the midway point T1.

Then, when the wrist terminal 1 moves to the location P3, the arrival determination unit 55 determines that the wrist terminal 1 has departed from the detection range for the midway point T1. When the arrival determination unit 55 determines that the wrist terminal 1 has departed from the detection range for the midway point T1, the detection range setting unit 54 reduces the detection range for the midway point T1.

After that, the location of the wrist terminal 1 is detected as the location P4 near the midway point T4. The estimated time of arrival at the midway point T4 has a large difference from the current time and the detection range for the midway point T4 is set as a smaller-radius circle. Therefore, the wrist terminal 1 does not fall within the detection range for the midway point T4 and the wrong determination on the arrival at the midway point T4 can be suppressed.

Subsequently, as illustrated in FIG. 7, when the current time is 9:00, the estimated time of arrival at the midway point T2 is 9:00. The detection range setting unit 54 thus sets the detection range for the midway point T2 as a large-radius circle. Meanwhile, the detection range setting unit 54 sets smaller detection ranges for the midway points T3 and T4 in this order as smaller-radius circles with larger differences between the current time and the estimated times of arrival. However, the differences between the current time and the estimated times of arrival at the midway points T3 and T4 are smaller than those in the state of FIG. 6 (the state at the current time of 8:00), and thus the radiuses of the detection ranges illustrated in FIG. 7 are set to be larger than the radiuses of the detection ranges illustrated in FIG. 6.

In the state of FIG. 7, when the wrist terminal 1 moves near the midway point T2, the locations of the wrist terminal 1 subsequent to the state of FIG. 6 are acquired in order as locations P5 to P7. When the wrist terminal 1 moves to the location P7 in the detection range, the arrival determination unit 55 determines that the wrist terminal 1 has arrived at the midway point T2.

After that, when the arrival determination unit 55 determines that the wrist terminal 1 has departed from the detection range for the midway point T2, the detection range setting unit 54 reduces the detection range for the midway point T2.

In the state of FIG. 7, when the current time becomes 10:00, the estimated time of arrival at the midway point T3 is 11:00. The same process as that for the midway point T2 illustrated in FIG. 7 is executed for the midway point T3. Specifically, the detection range setting unit 54 sets the detection range for the midway point T3 as a larger-radius circle, and sets the detection range for the midway point T4 as a smaller-radius circle. However, the difference between the current time and the estimated time of arrival at the midway point T4 is smaller than that in the state of FIG. 7 (the state at the current time of 10:00), the radius of the detection range illustrated in FIG. 7 is set to be larger than the radius of the detection range at the current time of 10:00.

In this state, when the wrist terminal 1 moves near the midway point T3, the locations of the wrist terminal 1 subsequent to the state of FIG. 7 are acquired in order as locations P8 to P11. When the wrist terminal 1 moves to the location P9 in the detection range, the arrival determination unit 55 determines that the wrist terminal 1 has arrived at the midway point T2.

After that, when the arrival determination unit 55 determines that the wrist terminal 1 has departed from the detection range for the midway point T3, the detection range setting unit 54 reduces the detection range for the midway point T3.

Further, as illustrated in FIG. 8, when the current time is 11:00, the estimated time of arrival at the midway point T4 is 11:00. The detection range setting unit 54 thus sets the detection range for the midway point T4 as a larger-radius circle.

In the state of FIG. 8, when the wrist terminal 1 moves near the midway point T4, the locations of the wrist terminal 1 subsequent to the state of arrival at the midway point T3 are acquired in order as locations P12 to P14. When the wrist terminal 1 moves to the location P14 in the detection range, the arrival determination unit 55 determines that the wrist terminal 1 has arrived at the midway point T4.

After that, when the arrival determination unit 55 determines that the wrist terminal 1 has departed from the detection range for the midway point T4, the detection range setting unit 54 reduces the detection range for the midway point T4.

The midway point T4 is approximate to the midway point T1, but the wrist terminal 1 has already arrived at the midway point T1 and the detection range setting unit 54 has reduced the detection range for the midway point T1. This makes it possible to suppress the wrong determination that the wrist terminal 1 has arrived at the midway point T1 in the state of FIG. 8.

On the other hand, when the detection range is not changed in size, it is more likely to cause wrong determinations on arrival at the specified points.

Figure 9:
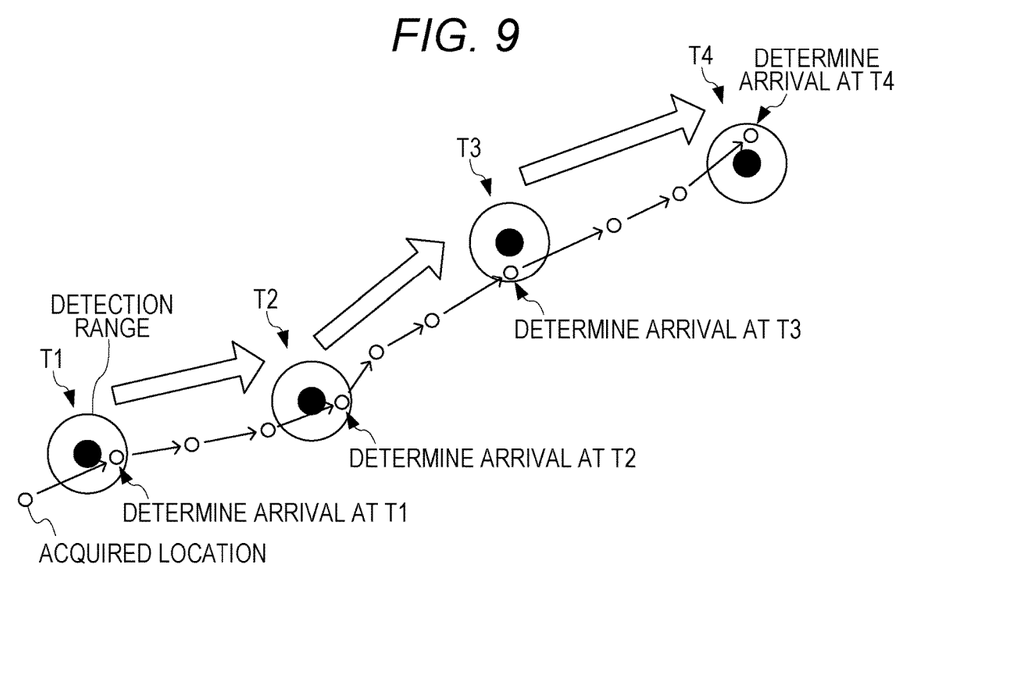
FIG. 9 is a diagram illustrating a comparative example of determination on arrival at specified points without change in sizes of the detection ranges.
Figure 10:
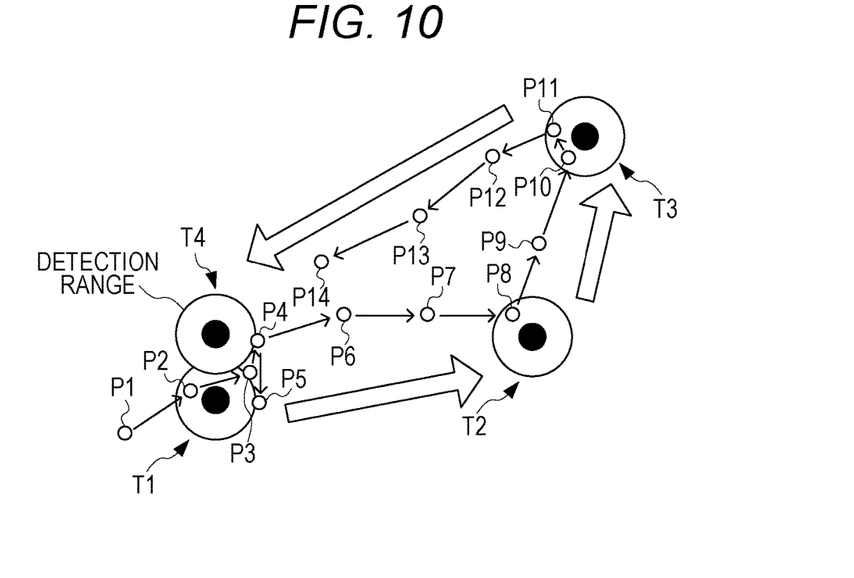
FIG. 10 is a diagram illustrating a comparative example of determination on arrival at specified points without change in sizes of the detection ranges.

FIGS. 9 and 10 are diagrams illustrating comparative examples of determination on arrival at specified points without change in sizes of the detection ranges.

In the route illustrated in FIG. 9, the midway points T1 to T4 are separated from each other and the wrist terminal 1 moves on a relatively simple path along the route.

In the example of FIG. 9, although the detection ranges are not changed in size, each entry of the wrist terminal 1 into the detection range for each of the specified points is detected. This allows appropriate determination on the arrival at the specified points.

Meanwhile, in the route illustrated in FIG. 10, the midway points T1 and T4 are approximate to each other as on the route illustrated in FIGS. 6 to 8. The movement path of the wrist terminal 1 fluctuates from the midway point T1 toward the midway point T4 and around the outer edge of the detection range for the midway point T1.

In the example of FIG. 10, unless the detection range is changed in size, when the wrist terminal 1 moves from the location P3 to the location P4, it is wrongly determined that the wrist terminal 1 has arrived at the midway point T4. In addition, when the wrist terminal 1 moves from the location P4 to the location P5, it is wrongly determined that the wrist terminal 1 has arrived again at the midway point T1.

In contrast, in the wrist terminal 1 of the present invention, it is possible to suppress the event that it is wrongly determined that the wrist terminal 1 has arrived at the specified points as illustrated in FIGS. 6 to 8.

[Application Example 1]

In the foregoing embodiment, each of the detection ranges is reduced after the arrival of the wrist terminal 1. Alternatively, the detection range may be enlarged when the wrist terminal 1 has entered the detection range.

Figure 11A:
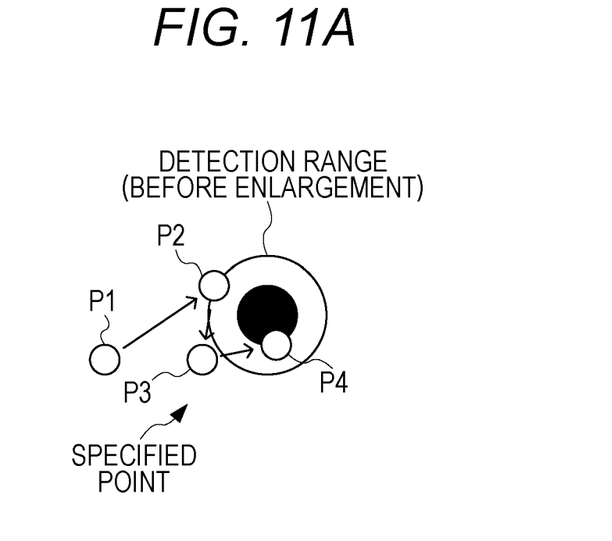
FIG. 11A illustrates the state immediately after the entry of the wrist terminal into the detection range.
Figure 11B:
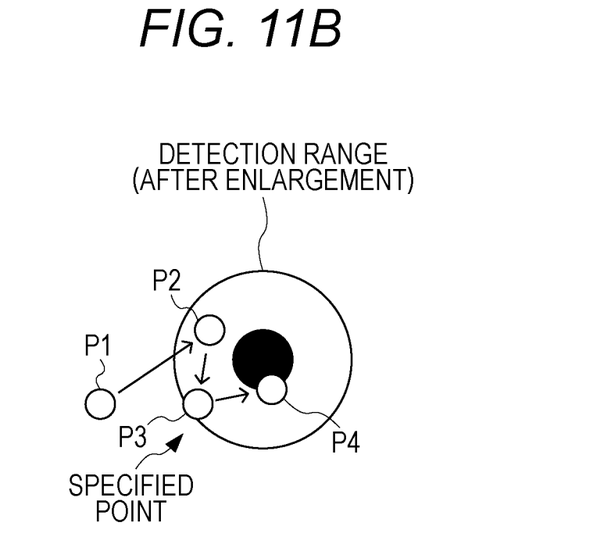
FIG. 11B illustrates the state where the detection range is enlarged after the entry of the wrist terminal into the detection range.

FIGS. 11A and 11B are schematic diagrams illustrating states where a detection range is enlarged at entry of the wrist terminal 1 into the detection range: FIG. 11A illustrates the state immediately after the entry of the wrist terminal 1 into the detection range; and FIG. 11B illustrates the state where the detection range is enlarged after the entry of the wrist terminal 1 into the detection range.

As illustrated in FIG. 11B, by enlarging the detection range after the wrist terminal 1 has entered the detection range, it is possible to suppress the event that, even when the wrist terminal 1 moves around the outer edge of the detection range, it is wrongly determined that the wrist terminal 1 has arrived again at the specified point, as compared to the case where the detection range is not changed in size. For example, referring to FIG. 11B, it is possible to suppress the event that, when the wrist terminal 1 moves to the locations P1 to P4 in order, it is wrongly determined that the wrist terminal 1 has entered again the detection range and has arrived again at the specified point at the time of movement from the location P3 to the location P4.

[Application Example 2]

In the foregoing embodiment, the detection range setting unit 54 changes the size of the detection range for each of the specified points, according to the progress status managed by the progress status management unit 53. However, the present invention is not limited to this. Specifically, the detection range setting unit 54 may change the shape of the detection range for each of the specified points, according to the progress status managed by the progress status management unit 53.

Figure 12A:
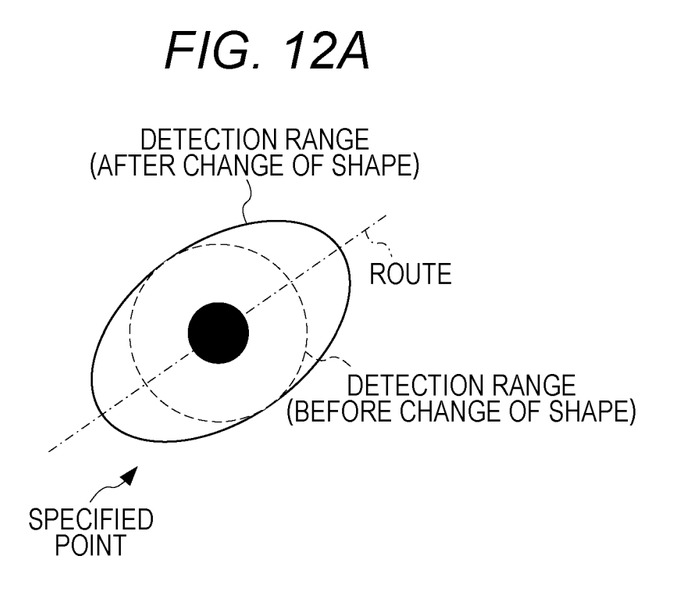
FIG. 12A is a diagram illustrating the enlarged shape of the detection range in a direction along the route.
Figure 12B:
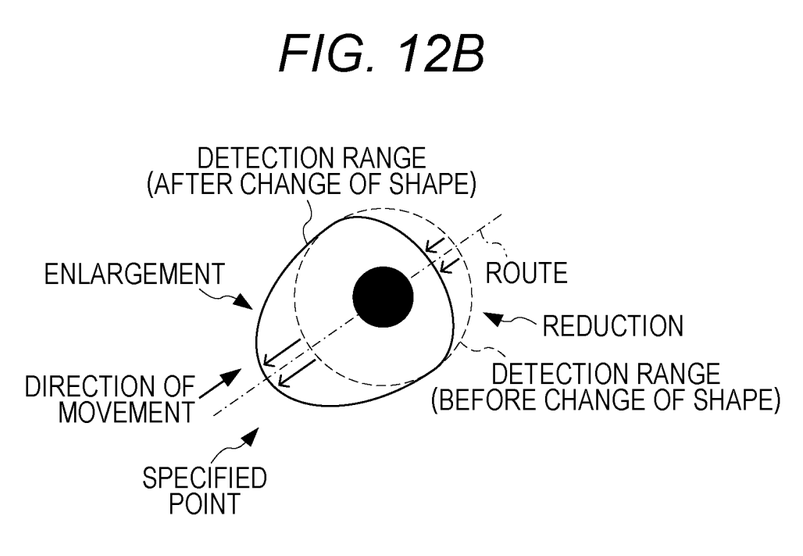
FIG. 12B is a diagram illustrating the shape of the detection range that is enlarged at the side of approach of the wrist terminal and is reduced at the side of separation of the wrist terminal, in accordance with the direction of movement.

FIGS. 12A and 12B are diagrams illustrating examples of changing the shape of the detection range for a specified point according to the progress status: FIG. 12A is a diagram illustrating the enlarged shape of the detection range in a direction along the route; and FIG. 12B is a diagram illustrating the shape of the detection range that is enlarged at the side of approach of the wrist terminal 1 and is reduced at the side of separation of the wrist terminal 1, in accordance with the direction of movement.

As illustrated in FIG. 12A, enlarging the detection range in the direction along the route facilitates the detection of arrival of the wrist terminal 1 in areas on the route on which the wrist terminal 1 is likely to move.

Also as illustrated in FIG. 12B, enlarging the detection range at the side of approach of the wrist terminal 1 before arrival of the wrist terminal 1 facilitates detection of arrival of the wrist terminal 1. In addition, reducing the detection range at the side of separation of the wrist terminal 1 after the arrival of the wrist terminal 1 makes it less prone to detect the arrival of the wrist terminal 1. When the shape of the detection range is to be changed, the distribution of existence probabilities of the wrist terminal 1 may be set for the specified points in advance in the direction along the route, or the direction of approach or separation of the wrist terminal 1 so that the shape of the detection range can be set according to the distribution of the existence probabilities.

The thus configured wrist terminal 1 includes the current location information acquisition unit 52 and the detection range setting unit 54.

The current location information acquisition unit 52 acquires the current location.

The detection range setting unit 54 sets the detection ranges for detecting arrival of the wrist terminal 1 at the specified points in order.

The detection range setting unit 54 also changes the modes of the detection ranges according to the location status of the wrist terminal 1 based on the relationship between the current location and the specified points.

This allows the modes of the detection ranges for the specified points to be changed according to the location status, which makes it possible to detect the arrival of the wrist terminal 1 at the specified points in a more appropriate manner.

Therefore, it is possible to determine more appropriately arrival of the wrist terminal 1 at the specified points on the route set on the map.

The detection range setting unit 54 also changes the modes of the detection ranges according to location status that is determined by the differences between the estimated times of arrival at the specified points and the current time.

This makes it possible to change more appropriately the modes of the detection ranges taking the estimated times of arrival into account.

The detection range setting unit 54 also changes the modes of the detection ranges according to location status that is determined by the distances between the specified points and the current location.

This makes it possible to change more appropriately the modes of the detection ranges taking into account the distances between the specified points and the current location.

The detection range setting unit 54 also changes the modes of the detection ranges according to location status that is determined by numbers set for the specified points at which the wrist terminal 1 has already arrived.

This makes it possible to change more appropriately the modes of the detection ranges taking into account the numbers set for the specified points at which the object has already arrived.

The detection range setting unit 54 also changes the sizes of the detection ranges as modes of the detection ranges.

This makes it possible to change more appropriately the modes of the detection ranges under the simple control.

The detection range setting unit 54 also reduces the detection ranges when the current location has departed from the detection ranges.

This makes it possible to suppress the event that, even though the current location includes error and causes fluctuations, it is wrongly determined that the wrist terminal 1 has entered again the detection range immediately after the departure from the detection range.

The detection range setting unit 54 also enlarges the detection ranges when the current location has entered the detection ranges.

This makes it possible to suppress the event that, even though the current location includes error and causes fluctuations, it is wrongly determined that the wrist terminal 1 has entered again the detection range when the wrist terminal 1 moves around the outer edge of the detection range.

The detection range setting unit 54 also changes the shapes of the detection ranges as the modes of the detection ranges.

This makes it possible to change more appropriately the modes of the detection ranges in flexible response to the status.

The present invention is not limited to the foregoing embodiment. The present invention also includes modifications, improvements, and others within the scope of the present invention to attain the object.

In the foregoing embodiment, the circular detection ranges are set for the specified points and are changed in size according to the progress status. However, the present invention is not limited to this. Specifically, the detection ranges may be set in any shape other than circle (such as oval, polygon, or any other shape formed by closed curves).

In the foregoing embodiment, the detection ranges for the specified points are reduced to predetermined sizes according to the progress status. However, the present invention is not limited to this. Specifically, the detection ranges may be reduced to be nonexistent (that is, the detection ranges are set to the size of zero).

In the foregoing embodiment, the sizes of the detection ranges for the specified points at which the wrist terminal 1 has not yet arrived are set according to the differences between the current time and the estimated times of arrival at the specified points. However, the present invention is not limited to this. Specifically, the sizes of the detection ranges for the specified points may be set according to the distances between the location of the wrist terminal 1 and the specified points. Alternatively, the sizes of the detection ranges for the specified points may be set according to the differences between the numbers for the specified points at which the wrist terminal 1 has already arrived and the numbers for the specified points at which the wrist terminal 1 has not yet arrived.

In the foregoing embodiment, the electronic device to which the present invention is applied is a wrist terminal. However, the present invention is not particularly limited to this.

For example, the present invention may be applied to any of general electronic devices having the function of determining arrival based on location information. Specifically, for instance, the present invention may be applied to notebook personal computers, video cameras, mobile navigation devices, mobile phones, smartphones, portable game machines, and others.

The series of steps described above may be executed by hardware or software.

In other words, the functional configuration illustrated in FIG. 2 is a mere example and the present invention is not particularly limited to this. Specifically, the wrist terminal 1 is merely needed to include the function of executing the entire series of steps described above, and the functional blocks to realize the function are not particularly limited to the example illustrated in FIG. 2.

Each of the functional blocks may be composed of single hardware or software, or may be composed of a combination thereof.

To execute the series of steps by software, a program constituting the software is installed from a network or a recording medium to a computer or the like.

The computer may be a computer incorporated into dedicated hardware. Otherwise, the computer may be a general-purpose personal computer in which various programs are installed to perform various functions, for example.

The recording medium containing such programs are composed of not only the removable medium 31 illustrated in FIG. 1 that is distributed separately from the device main body to provide the user with the programs but also a recording medium or the like that is provided to the user in the state of being incorporated in advance into the device main body. The removable medium 31 is composed of a magnetic disk (including a floppy disk), optical disk, or magneto-optical disk, for example. The optical disk is composed of a Compact Disk-Read Only Memory (CD-ROM), Digital Versatile Disk (DVD), Blu-ray (registered trademark) disk or the like, for example. The magneto-optical disk is composed of an Mini-Disk (MD) or the like, for example. The recording medium to be provided to the user in the state of being incorporated in advance into the device main body, is composed of the ROM 16 illustrated in FIG. 1 recording the programs, for example.

The steps describing the programs recorded in the recording medium herein include not only steps to be executed in chronological order but also steps not necessarily to be executed in chronological order but to be executed in parallel or separately.

As in the foregoing, some embodiments of the present invention are described. However, these embodiments are mere examples and are not intended to limit the technical scope of the present invention. The present invention can be carried out in various other embodiments and can be modified in various manners such as omission or replacement without deviating from the gist of the present invention. These embodiments and their modifications are included in the scope and gist of the invention described herein, and are also included in the scope of the invention described in the claims and their equivalent scopes.

What is claimed is:

1. An electronic device comprising:
    a location information acquisition unit configured to acquire a current location of the electronic device;
    a route setting unit configured to set a plurality of specified locations having an order of arrival;
    a detection range setting unit configured to set detection ranges for detecting arrival of the electronic device at the plurality of specified locations; and
    a detection range control unit configured to change the detection ranges according to a movement status of the electronic device that is determined by differences between estimated times of arrival of the electronic device at the plurality of specified locations and a current time.

2. An electronic device comprising:
    a location information acquisition unit configured to acquire a current location of the electronic device;
    a route setting unit configured to set a plurality of specified locations having an order of arrival;
    a detection range setting unit configured to set detection ranges for detecting arrival of the electronic device at the plurality of specified locations; and
    a detection range control unit configured to change the detection ranges according to a location status of the electronic device that is determined by distances between the specified locations and the current location.

3. The electronic device according to claim 1, wherein the detection range control unit is further configured to change sizes of the detection ranges.

4. The electronic device according to claim 1, wherein the detection range control unit is further configured to reduce the detection ranges when the current location has departed from the detection ranges.

5. The electronic device according to claim 1, wherein the detection range control unit is further configured to enlarge the detection ranges when the current location has entered the detection ranges.

6. The electronic device according to claim 1, wherein the detection range control unit is further configured to change shapes of the detection ranges.

7. An arrival determination method executed by an electronic device, the method comprising:
    acquiring a current location of the electronic device;
    setting a plurality of specified locations having an order of arrival;
    setting detection ranges for detecting arrival of the electronic device at the plurality of specified locations; and
    changing the detection ranges according to a movement status of the electronic device that is determined by differences between estimated times of arrival of the electronic device at the plurality of specified locations and a current time.

8. A non-transitory computer-readable recording medium having a program recorded thereon for controlling an electric device to execute:
    a location information acquisition function to acquire a current location of the electronic device;
    a route setting function to set a plurality of specified locations having an order of arrival;
    a detection range setting function to set detection ranges for detecting arrival of the electronic device at the plurality of specified locations; and
    a detection range control function to change the detection ranges according to a movement status of the electronic device that is determined by differences between estimated times of arrival of the electronic device at the plurality of specified locations and a current time.

9. The electronic device according to claim 1, further comprising:
    an arrival determination unit configured to determine whether or not the electronic device has arrived within the detection ranges set by the detection range setting unit.

10. The electronic device according to claim 1, wherein the detection range setting unit is configured to set a different detection range for detecting the arrival of the electronic device at each of the plurality of specified locations.

* * * * *